United States Patent
Bonaldi et al.

(10) Patent No.: US 11,326,117 B2
(45) Date of Patent: May 10, 2022

(54) COMBUSTIBLE ARTICLE COMPRISING LIGNIN

(71) Applicant: Biochemtex S.p.A., Tortona (IT)

(72) Inventors: Ettore Bonaldi, Commugny (CH); Alessandra Giusti, Milan (IT)

(73) Assignee: Versalis S.p.A., Milan (IT)

( * ) Notice: Subject to any disclaimer, the term of this patent is extended or adjusted under 35 U.S.C. 154(b) by 805 days.

(21) Appl. No.: 16/074,092

(22) PCT Filed: Feb. 10, 2017

(86) PCT No.: PCT/EP2017/052968
§ 371 (c)(1),
(2) Date: Jul. 31, 2018

(87) PCT Pub. No.: WO2017/137539
PCT Pub. Date: Aug. 17, 2017

(65) Prior Publication Data
US 2021/0102135 A1    Apr. 8, 2021

(30) Foreign Application Priority Data

Feb. 12, 2016  (EP) .................................. 16425008

(51) Int. Cl.
*C10L 5/32* (2006.01)
*C10L 5/36* (2006.01)
*C10L 5/44* (2006.01)
*C10L 5/48* (2006.01)

(52) U.S. Cl.
CPC ................ *C10L 5/32* (2013.01); *C10L 5/363* (2013.01); *C10L 5/442* (2013.01); *C10L 5/447* (2013.01); *C10L 5/48* (2013.01); *C10L 2290/08* (2013.01); *C10L 2290/20* (2013.01); *C10L 2290/24* (2013.01); *C10L 2290/30* (2013.01); *C10L 2290/50* (2013.01); *C10L 2290/546* (2013.01)

(58) Field of Classification Search
CPC .. C10L 5/32; C10L 5/363; C10L 5/442; C10L 5/447; C10L 5/48; C10L 2290/08; C10L 2290/20; C10L 2290/24; C10L 2290/30; C10L 2290/50; C10L 2290/546
See application file for complete search history.

(56) References Cited

U.S. PATENT DOCUMENTS

| | | |
|---|---|---|
| 4,308,033 A | 12/1981 | Gunnerman |
| 4,389,218 A | 6/1983 | Pike |
| 4,552,775 A | 11/1985 | Baeling et al. |
| 8,852,301 B1 | 10/2014 | Bootsma |
| 2009/0056205 A1 | 3/2009 | Gauthier et al. |
| 2010/0154296 A1* | 6/2010 | Malhotra ................. C10L 5/14 44/590 |
| 2015/0004654 A1 | 1/2015 | Retsina et al. |

FOREIGN PATENT DOCUMENTS

| | | | |
|---|---|---|---|
| WO | 2009/058276 A1 | 5/2009 | |
| WO | WO-2010022511 A1 * | 3/2010 | ............... C08H 8/00 |

* cited by examiner

*Primary Examiner* — Latosha Hines
(74) *Attorney, Agent, or Firm* — Edwin A. Sisson, Attorney at Law, LLC; Edwin A. Sisson; Jeffrey Banyas

(57) ABSTRACT

It is disclosed a combustible article of manufacture comprising a treated lignin composition and a combustible support, wherein the treated lignin composition is attached to at least a portion of an external surface of the combustible support with a force greater than the force of gravity relative to the treated lignin composition. The treated lignin composition comprises solid lignin and has a moisture content in the range of 35% to 80% percent by weight. The combustible support is preferably a hardwood chip, but it may be also softwood chips, coal, coke, and shredded tires.

It is also disclosed a fuel composition comprising a plurality of the combustible article.

19 Claims, No Drawings

COMBUSTIBLE ARTICLE COMPRISING LIGNIN

PRIORITIES AND CROSS REFERENCES

This application claims priority from International Application No. PCT/EP2017/052968 filed on 10 Feb. 2017 which claims priority from European Application No. 16425008.6 filed on 12 Feb. 2016, the teachings of each of which are incorporated by reference herein in their entirety.

BACKGROUND

The increased attention on using renewable sources for energy has created the need to use biomass, particularly lignocellulosic biomass as a fuel source. Many industrial processes produce lignin containing by-products which are eventually burned for heat recovery. However, as the by-products are often extremely wet, past efforts have focused on drying, or removing the moisture. And in some cases, practitioners create shaped pellets from the dried product or create pellets and then dry them.

In a typical biomass operation it is common practice to burn the lignin containing by-products from industrial processes, referred to as the treated lignin composition in this specification. However, the treated lignin composition usually has too much water relative to the calorific materials so that the treated lignin composition must be dried in order to feed an industrial boiler and in some instances dried so that it can be burned and dried so that one spends the calorific value heating the water in the treated lignin composition. Accordingly, earlier efforts to use the treated lignin composition have always included a drying step to produce a "dry product".

For example, it is well known to remove the solid lignin composition from the stillage of a fermentation process by filtering, pressing or centrifuging. This treated lignin composition cannot be used "as is" in a boiler because it is very sticky making it hard to convey, it forms clumps in the feeding system, sticks to the equipment forming build up that interferes with feeding the furnace. As noted below, the prior art teaches blending the treated lignin composition with other products to form a mixture having a matrix phase and a dispersed phase, usually with a binder, reshaping the dispersion (making pellets) and further drying of the mixture before burning.

WO 2009/058276 teaches that U.S. Pat. No. 4,552,775 discloses a method for dewatering the stillage comprising 20-30% solids derived from a unique fermentation process. This high solid stillage (the treated lignin composition) is combined with sufficient recycled dry product to obtain a 50-70% solids content, which is then pelletized and air dried.

WO 2009/058276 further teaches the recovery and retention of the solids stream allows for the production of dense, activated carbon rich by-product that can be compressed into energy-pellets or dried carbon cakes. Such solids, pellets and cakes are suitable for combustion in various boiler types such as a fluidized bed boiler, stoker, or suspension fired boilers depending upon the degree of de-watering the solids have been subjected to.

These prior art processes rely upon dewatering, homogenously blending the by-products with other products and reshaping them into a consistent size, such as a cake or pellet.

There exists therefore the need to use the treated lignin as a fuel without having to further dry or reshape it.

BRIEF DESCRIPTION OF THE INVENTION

This specification discloses a combustible article of manufacture comprising a combustible support having an external surface and a treated lignin composition. The treated lignin composition comprises solid lignin and has a moisture content in the range of 35% to 80% percent by weight on a wet basis and is attached to at least a portion of the external surface of the combustible support with a force greater than the force of gravity relative to the treated lignin composition.

It is also disclosed that the combustible support has dimensions so that it is capable of passing through a first sieve having first circular holes having a first diameter which is in a range of from 1 cm to 20 cm and is not capable of passing through a second sieve having second circular holes having a second diameter which is in a range of from 5 mm to 100 mm, and the first diameter is greater than the second diameter.

It is further disclosed that the combustible support may have a moisture content on a wet basis which is a value in a range selected from the group consisting of from 1% to 60%, from 2% to 15%, from 2 to 10%, from 20 to 60%, and from 30% to 45%.

It is also disclosed that the combustible support may be selected from the group consisting of hardwood chips, softwood chips, coal, coke, and shredded tires.

It is further disclosed that the treated lignin composition may be selected from the group consisting of steam exploded lignin, ammonia exploded lignin, and hydrothermally treated lignin.

It is also disclosed that the treated lignin composition may comprise a stillage residue of a fermentation process or a hydrolysis process.

It is further disclosed that the treated lignin composition may further comprise carbohydrates, and the total percent amount by weight of the carbohydrates in the treated lignin composition on a dry basis is in a range selected from the group consisting of from 5% to 45%, from 10% to 40%, and from 15% to 30%.

It is also disclosed that the treated lignin composition may be obtained without adding sulfuric acid.

It is further disclosed that the article has an amount of sulfur with the amount of sulfur less than 0.3% on a dry basis.

It is also disclosed that the treated lignin composition may be selected from the group consisting of kraft lignin and organosolv lignin.

It is further disclosed that the weight ratio of the treated lignin composition substrate to the combustible support on a wet basis may be in a range of 1:10 to 3:1, from 1:2 to 2:1, and from 1:1.5 to 1.5:1.

It is also disclosed that the treated lignin composition may attached to a portion of the external surface of the combustible support which is greater than a percent value selected from the group consisting of 50%, 70%, 80%, and 90% of the external surface of the combustible support.

It is further disclosed that the moisture content of the treated lignin composition on a wet basis may be a value in a range selected from the group consisting of from 50% to 70%, and from 55% to 65%.

It is also disclosed that the moisture content of the article on a wet basis may be less than a value selected from the group consisting of 60%, 55%, and 50%.

It is further disclosed a fuel composition, comprising a plurality of the disclosed article.

DESCRIPTION

It has been discovered that one can create a two component article with one component being an undried treated lignin composition, and the other being a combustible support, like a wood chip, coal, coke, or shredded tire. The treated lignin composition when mixed with the wood chip will attach itself to the wood chip. In many instances the treated lignin composition will form a coating or layer around the combustible support, e.g. the wood chip. This article is a unitary piece having a unique shape and is capable of being transported and fed to industrial boilers, wherein it can be burned and used as a fuel without further drying.

The support may be a combustible bio-based support, such as wood chip, or a combustible fossil support, such as coal, coke, or shredded tire chip.

In the case of a wood chip, it is possible to create an article wherein 100% of its carbon is "new carbon" source as measured by ASTM test method D 6866-05, "Determining the Biobased Content of Natural Range Materials Using Radiocarbon and Isotope Ratio Mass Spectrometry Analysis", incorporated herein by reference in its entirety. This test method measures the $^{14}C/^{12}C$ isotope ratio in a sample and compares it to the $^{14}C/^{12}C$ isotope ratio in a standard 100% biobased material to give percent biobased content of the sample. "Biobased materials" are organic materials in which the carbon comes from recently (on a human time scale) fixated $CO_2$ present in the atmosphere using sunlight energy (photosynthesis). On land, this $CO_2$ is captured or fixated by plant life (e.g., agricultural crops or forestry materials). In the oceans, the $CO_2$ is captured or fixated by photosynthesizing bacteria or phytoplankton. For example, a biobased material has a $^{14}C/^{12}C$ isotope ratio greater than 0. Contrarily, a fossil-based material has a $^{14}C/^{12}C$ isotope ratio of about 0.

When an old carbon source, or fossil carbon source, such as coal or coke, is used as the combustible support, the percent $^{14}C/^{12}C$ isotope ratio of the article to the $^{14}C/^{12}C$ isotope ratio in a standard 100% biobased material is greater than 0 and less than 100%, preferably in a range from 20% to 90%, more preferably from 40% to 80%. The $^{14}C/^{12}C$ isotope ratio of the article may be fixed by varying the relative amounts of the treated lignin composition and the combustible fossil substrate in the article.

In tests, described below, this article, referred to as a fuel nugget, has been found to completely replace the natural gas in the furnace when supplied as a plurality to a furnace. While natural gas is used to start the burning, the natural gas is turned off and the plurality of fuel nuggets sustain their own flame and burn completely. When provided as a plurality of articles, or plurality of fuel nuggets, the plurality is called a fuel composition and is comprised of a plurality of the created articles, or comprised of a plurality of fuel nuggets.

As described below, the process advantageously uses relatively large sized combustible supports, thus lowering the costs of grinding or cutting, of the combustible support. The combustible support has a moisture content and can be used without further drying, again lowering the costs. The treated lignin composition has a moisture content and can also be used "as is" which is the use of the article as a fuel in its wet state without further drying. As the article (the fuel nugget), can be used immediately without further drying, costs are saved in that manner as well.

It will also become clear that there is no need for the intense blending and reshaping processes used in the dispersion/pelletizing/briquette processes, thus saving the costs of capital for additional equipment and reduced energy consumption. Thereby, in a preferred embodiment, the invented article is not a briquette and is not been made by a briquetting process. Additionally, the preferred embodiment is not a pellet and it is not made by a pelletizing process. In a further preferred embodiment, the invented article is not a blend of many combustible supports. As described in the experimental section, a conveying screw system provides sufficient mixing of the treated lignin composition with the combustible support so that the treated lignin composition attaches to the surface of the combustible support and forms the plurality of fuel nuggets. While a conveying screw is sufficient, a mixing or kneading screw system with more compression and more mixing time provides a better coverage of the surface of the combustible support by the treated lignin composition. The output of the screw is a plurality of separate distinct fuel nuggets as opposed to the prior art which produces a tight and compact "pellet" which must be further pelletized or re-sized. In the current invention no sizing is required. Accordingly the invented article is not re-sized.

Moisture content is a term used throughout the specification. As used in this specification, the moisture content is determined by the "loss in weight" method specified in the experimental section. This method also recognizes the volatiles which are driven from the solid as part of the moisture content.

The percent moisture content is:

$$\left[ \frac{\text{(Weight of the Sample Before Drying} - \text{Weight of the Sample After Drying)}}{\text{Weight of the Sample Before Drying}} \right] \times 100$$

In a typical ligno-cellulosic biomass conversion process, the feedstock is pretreated in any number of ways creating a treated lignin composition as the by-product. This treated lignin composition will comprise at least solid lignin. The other components of the composition will often depend upon the treatment.

Preferred treated lignin compositions are steam exploded lignin, ammonia exploded lignin, and hydrothermally treated lignin. A hydrothermally treated lignin is obtained by a treatment process comprising an hydrothermal pre-treatment of the ligno-cellulosic biomass, therefore the treated lignin composition will contain lignin which has been hydrothermally treated. Hydrothermal treatment is conducted in water in liquid or vapor phase in pressurized conditions at a temperature which is tipically from 130° C. to 200° C., often in the presence of catalysts such as a mineral acid, one of which is sulfuric acid.

A steam exploded lignin is obtained by a treatment process comprising a steam explosion pre-treatment of the ligno-cellulosic biomass, therefore the treated lignin composition will contain lignin which has been steam exploded. Steam explosion treatment typically subjects the ligno-cellulosic biomass to a pressurized hydrothermal treatment in water in liquid or vapor phase at a pressure typically greater than 15 bar, followed by rapidly releasing the pressure applied to the biomass so that the water inside the vacuoles of the ligno-cellulosic biomass rapidly expands so as to increase the size of, or even burst (explode), the cells.

An ammonia exploded lignin composition is obtained by a treatment process comprising ammonia fiber explosion pre-treatment (AFEX) of the ligno-cellulosic biomass, therefore the treated lignin composition will contain lignin which has been exploded using ammonia. AFEX treatment typically subjects the ligno-cellulosic biomass to a pressurized hydrothermal treatment in the presence of water and ammonia at a pressure typically greater than 15 bar, followed by rapidly releasing the pressure applied to the biomass so that the ammonia and water inside the vacuoles of the lignin rapidly expand so as to increase the size of, or even burst (explode), the cells.

Preferably, the treatment process to obtain the treated lignin composition further comprise a hydrolysis process of the ligno-cellulosic biomass which has been pretreated according to the preferred pre-treatments. The preferred hydrolysis comprises an enzymatic hydrolysis of the pre-treated ligno-cellulosic biomass to solubilize at least a portion of the water-insoluble carbohydrates of the ligno-cellulosic biomass, thereby producing a hydrolyzed mixture comprising water, water soluble sugars and a solid hydrolysis residue comprising lignin and optionally residual carbohydrates. The hydrolyzed mixture is in the form of a diluted slurry, wherein the solid hydrolysis residue may be present in an amount ranging from 5 to 20% by weight of the diluted slurry on a wet basis.

The treatment process to obtain the treated lignin composition may further comprise subjecting the hydrolyzed mixture to a fermentation process in the presence of a yeast, to produce a fermentation mixture comprising water, a fermentation product, e.g. ethanol, and a solid fermentation residue. As the enzymatic hydrolysis of the residual carbohydrates in the solid hydrolysis residue may be extended in the fermentation step, the solid fermentation residue comprises lignin and it may contain slightly less carbohydrates than the hydrolyzed mixture. The fermentation product may be separated from the fermentation mixture, typically by distillation. Also the fermentation mixture is in the form of a diluted slurry, wherein the solid fermentation residue may be present in an amount ranging from 5 to 20% by weight of the diluted slurry on a wet basis.

In a preferred embodiment, the treated lignin composition comprises at least a portion of a stillage residue selected from the group consisting of solid hydrolysis residue and the solid fermentation residue, or mixture thereof. Therefore, the treated lignin composition may further comprise residual carbohydrates, mainly glucans and xylans, which have not been converted to soluble sugars, and the total percent amount by weight of the carbohydrates in the treated lignin composition on a dry basis may be in a range of from 5% to 45%, preferably of from 10% to 40%, and most preferably of from 15% to 30% of the treated lignin composition.

The treated lignin composition comprises very fine solid particles (<5 mm and usually less than 2 mm) and water and other residual volatiles.

Therefore, the treated lignin composition may be obtained by separating at least a portion of the solid residues from the hydrolysis mixture or the fermentation mixture. Separation is typically done by means of at least one apparatus selected from the group consisting of a centrifuge, a filter press, a belt press, and a decanter. Separation may occur in multiple steps, to progressively reduce the moisture content of the treated lignin composition and may involve the use of a flocculating agent to promote the precipitation, agglomeration, coalescence, or coagulation of the particles in the treated lignin composition.

The treated lignin composition is preferably obtained without adding sulfur containing acids such as sulfuric acids. Chloride based acids are also preferably avoided, as both the elements may increase the emission of undesirable gases during combustion of the disclosed article. Thereby, the treated lignin composition has a sulfur content in an amount which is less than 0.3% by weight of the composition and is preferably natural sulfur already present in the ligno-cellulosic biomass.

In another embodiment the treated lignin composition comprises a kraft lignin, which is a lignin obtained from a black liquor, typically by precipitation, in a kraft pulping process. A kraft lignin is usually obtained by means of a process involving multiple acidification and filtration/centrifugation steps, and optionally washing steps to remove salts and other inorganic elements and compounds. Nevertheless, sulfur content of a kraft lignin is typically greater than the sulfur content of a steam exploded lignin.

In a further embodiment, the treated lignin composition comprises organosolv lignin, which is obtained by a pulping process that uses an organic solvent to solubilize lignin and hemicellulose. Organosolv pulping involves contacting a lignocellulosic biomass such as chipped wood with an aqueous organic solvent at temperatures ranging from 140 to 220° C. This causes lignin to break down by hydrolytic cleavage of alpha aryl-ether links into fragments that are soluble in the solvent system. Solvents used include acetone, methanol, ethanol, butanol, ethylene glycol, formic acid, and acetic acid. Organosolv lignin is then precipitated by means of one or many acidification steps, and the precipitated lignin is recovered by means of filtration and/or centrifugation. For the purposes of this invention, the treated lignin composition has a moisture content by weight on a wet basis in the range of 35% to 80%, preferably in the range of from 50% to 70%, and most preferably in the range of from 55% to 65%.

What has been further discovered is that the treated lignin composition attaches itself to many substrates and many of those substrates are combustible. In this specification, such a substrate is called a combustible support.

A combustible support stores energy in the form of chemical energy that could be released through combustion in the form of heat. Combustion is a high-temperature exothermic redox chemical reaction between a fuel and an oxidant, usually atmospheric oxygen, that produces oxidized, often gaseous products, in a mixture termed as smoke. Combustion may produce a flame, and the heat produced can make combustion self-sustaining. Combustion is often a complicated sequence of elementary radical reactions. Solid fuels, such as wood, first undergo endothermic pyrolysis to produce gaseous fuels whose combustion then supplies the heat required to produce more of them.

While the combustible support is also a solid, it may have a moisture content, it does not flow as a slurry or sludge would flow. The combustible support will have an external surface. This external surface is generally irregular in nature, having many facets and sides. These facets or sides are usually the result of imperfect cuts and physical fractures made when the support is created and sized.

Examples of combustible supports are wood chips, both the hard and soft wood chips. A hardwood chip is a chip derived from the dicot angiosperm trees. The angiosperm tree reproduce by flowers. The softwood chip is a chip derived from the gymnosperm trees. The hardwoods have a more complex structure than softwoods. The dominant feature separating "hardwoods" from "softwoods" is the presence of pores, or vessels. The vessels may show considerable variation in size, shape or perforation plates (simple, scalariform, reticulate, foraminate), and structure of cell wall, such as thickenings.

Preferably the combustible support is a hardwood chip. More preferably the wood chip is selected from the: *Salix* species, *Alnus* species, *Carpinus* species, *Populus* species, *Quercus cerris* species, *Quercus laevis* species, *Acer* species, *Quercus* species, *Fraxinus* species, *Betula* species, *Fagus* species, *Ulmus* species, *Castanea* species, *Robinia* species, *Larix* species, *Pseudotsuga* species, *Picea* species, *Pinus* species, or mixture thereof.

As all ingredients are derived from renewable resources having a 100% new carbon, the resulting article contains 100% new carbon.

Coal, coke, and shredded tire pieces are also good combustible supports, which are not renewable. The resulting article will therefore have a percent content of new carbon which is less than 100%, and which will clearly depend on the weight ratio of the two components of the article.

The discovery is that it is possible to create an article, called a fuel nugget, comprised of the treated lignin composition and the combustible support by attaching the treated lignin composition to at least a portion of the external surface of the combustible support. Therefore, the article is comprised of lignin with the lignin attached to a single combustible support. This attaching is readily done by physically contacting the combustible support with the treated lignin composition, and the physical contact is promoted by exerting at least a mechanical pressure between the two components. The mechanical pressure may involve compression and shear forces which promote the adhesion of the treated lignin composition to the support. The mechanical action sufficient to attach the treated lignin composition to the support does not need to be intense. Therefore, even if the treated lignin composition may be more firmly attached to the support by increasing the mechanical action exerted, the article may be produced merely by contacting the combustible support with the treated lignin composition such as the contact done in a conveying screw.

In one embodiment, the article is produced by continuously inserting the treated lignin composition and a plurality of combustible supports from one or more inlets of a screw conveying device, wherein the two components of the article are mixed to form a plurality of the article while being conveyed to an outlet of the screw conveying device. The plurality of the article is then removed from the outlet of the screw conveying device. The process does not require a long time and the residence time of the combustible support in the screw conveying device may be less than 10 minutes, preferably less than 5 minutes, most preferably less than 1 minute. Even if a single screw conveyor may be used, a twin screw conveyor or a multi-screw conveyor are preferred, as it promotes the mixing and the contacting of the two components of the article. The twin screw conveyor may be operated in co-rotating or counter-rotating mode. Mixing elements, such as mixing paddles, may be distributed along the length of the screw or screws of the screw conveying device. The profile of the conveying screw may also have a certain volumetric compression ratio which is greater than 1:1, as in a pure conveying screw, but preferably is less than 1.5:1. Thereby, a certain amount of liquid contained in the treated lignin composition may be removed during the process to produce the article, and the liquid may be withdrawn from the process, thereby reducing the moisture content of the treated lignin composition and the produced article.

In another embodiment, the treated lignin composition and a plurality of combustible supports are inserted in a mixing vessel provided of rotating paddle arms, which can be operated in a continuous or batch mode.

A person skilled in the art may easily select and properly operate the apparatus needed to produce the article on the basis of the information disclosed in this specification. When processed in this manner, the treated lignin composition is attached to at least a portion of the external surface of the combustible support. To be attached, means that the treated lignin composition and the external surface are stuck together with a force at least as great as the force of gravity upon the treated lignin composition. Thereby, the expression "to be attached" it is not intended to limit the interaction between the treated lignin composition and the combustible support to any specific mechanism. An equivalent expression which can be used is that that the treated lignin composition adheres on the external surface of the combustible support. One only need to turn hold the combustible support with the treated lignin composition facing the ground to determine whether the treated lignin composition is attached to the external surface with a force at least as great as the force of gravity upon the treated lignin composition. If some of the treated lignin composition remains attached to the combustible support, then that portion of the lignin composition is attached to the combustible support with a force at least as great as the force of gravity upon the treated lignin composition. If the attachment force were less than the force of gravity the treated lignin composition would fall off the combustible support.

Portions of the treated lignin composition may fall to the ground, but so long as some of the treated lignin composition stays with the combustible support, the pretreated lignin composition remains attached to at least a portion of surface of the combustible support with a force at least as great as the force of gravity upon the treated lignin composition. Usually when a portion of the treated lignin composition falls to the ground, it is part of the treated lignin composition disengaging from itself, not from the combustible support.

The actually size of the combustible support is not so important in making the article, but rather it is the size of the combustible support which is important when burning or conveying the article. The size specification is therefore a design choice dictated by the furnace burning the article, the furnace feeding system and the conveying and transporting systems. However, for most applications the dimensions of the combustible support can be defined according to the sieve system, where the combustible support passes through a first sieve of round holes of the same first diameter but will not pass through a second sieve of round holes of the same second diameter and the first diameter is greater than the second diameter. In particle size nomenclature a combustible support which passes through a 100 mm diameter hole, (the first diameter) and does not pass through a 10 mm diameter hole (the second diameter, which is less than the first diameter) is written −100 mm/+10 mm, while this example is broad range, it clearly specifies the size as being objectively less than 100 mm but greater than 10 mm.

Accordingly, it may be said that dimensions of the combustible support are such that the combustible support may have a size selected that the combustible support passes through a first sieve of sized round holes each having a same first diameter in the range of 10 mm to 200 mm, but will not pass through a second sieve of round holes each having a same second diameter in the range of 5 mm to 100 mm, and the first diameter is greater than the second diameter. A narrower range is more preferable with the combustible support able to pass through a first sieve of sized round holes each having a same first diameter in the range of 10 mm to 150 mm, but will not pass through a second sieve of round holes each having a same second diameter in the range of 5 mm to 100 mm, and the first diameter is greater than the second diameter. The preferred size ranges of the combustible support correspond to excellent results in burning the article, while the homogeneity of combustion progressively decreased with reducing the size.

When used as a fuel, the fuel comprises a plurality of articles, i.e. a plurality of combustible supports, each having the treated lignin composition attached to at least a portion of the external surface of the combustible support. In the instance of being used a fuel, uniform distribution is generally required with specifications often set around the maximum amount by weight of articles or combustible supports which can be considered "overs". Overs are those particles that do not pass through a first sieve of sized round holes each having a same first diameter in the range. That is they are oversized. The amount of these overs is expressed as a percent by weight overs of the total plurality analyzed. (i.e. 5%, +100 mm).

The plurality will also comprise unders or fines, which are those articles or combustible supports which pass through the second sieve of round holes each having a same second diameter in the range of 5 mm to 100 mm, and the first diameter is greater than the second diameter. The amount of these unders is expressed as a percent by weight unders of the total plurality analyzed. (i.e. 5%, −10 mm)

So instead of a wide range of 100 to 10 mm, the larger first diameter is often reduced to say 75 mm and the smaller, second diameter is raised to 15 or 20 mm to provide a more consistently sized plurality of articles for feeding the furnace or boiler.

The moisture content of the combustible support may vary over a wide range, depending on the kind of the substrate. The moisture content may be in a range of 1% to 60%, but in some embodiments it may be from 1% to 15%, most preferably from 2 to 10%, for instance in the case of coal and shredded tires as combustible support. In other embodiments, the moisture content may be from 20 to 60%, more preferably from 30% to 45%, as in the case of wood chip as combustible support.

The amount of treated lignin composition which can be attached to the external surface of the combustible support may also greatly exceed the weight of the combustible support and may be easily controlled by varying the relative weight ratios of treated lignin composition and combustible support used to manufacture the article. The weight ratio of the treated lignin composition substrate to the combustible support on a wet basis may be in a range from 1:10 to 3:1, preferably from 1:2 to 2:1, and most preferably from 1:1.5 to 1.5:1.

Depending on the relative amounts of the two components of the article and their individual moisture content, the total moisture content of the manufactured article by weight on a wet basis is preferably less than 60%, with less than 55% more preferred, less than 50% most preferred.

Preferably, the treated lignin composition is attached to the whole external surface of the combustible support, that is 100% of the external surface of the combustible support is covered by the treated lignin composition. In some cases, some portion of the external surface of the combustible support may not have treated lignin composition attached, or the thickness of the attached layer may be very thin, such as less than 1 mm. While it is preferred that the whole surface of the support is covered by the treated lignin composition, it has been noted that the article can be used as a fuel in the case when only a portion of the external surface of the support has the treated lignin composition attached. Preferably, the treated lignin composition is attached to at least 50% of the external surface of the combustible support, more preferably to at least 70% of the external surface of the combustible support, even more preferably to at least 80% of the external surface of the combustible support, and most preferably to at least 90% of the external surface of the combustible support. The total coverage of the external surface will clearly depend on the process used to produce the article, and a person skilled in the art can easily tune the process conditions to reach a target coverage. The presence of treated lignin composition attached may be verified by measuring the thickness of the treated lignin composition in different points of the external surface of the combustible support. It is considered that the treated lignin composition is attached to the support if the thickness of the treated lignin composition is greater than or equal to 0.5 mm. The area of the external surfaces may be determined by standard 3D laser scanning methods. The thickness of the attached treated lignin composition may vary on a great extent, and it has been noted that its inhomogeneity does not create any detectable problem in burning the article. Therefore, the local thickness of the treated lignin composition may be from 0.5 mm to 20 mm, preferably from 0.5 mm to 10 mm, and most preferably from 0.5 mm to 3 mm. As the treated lignin composition is a self adhering/self attaching substance, the article may also be free of an added binder. The prior art often teaches adding a binder to create its pellets. In this article, there is no need for the practitioner to add a binder during the manufacturing process.

The article may be made according to the following examples.

EXPERIMENTAL

An exemplary treated lignin composition was obtained as a by-product of a conversion process of a wheat straw feedstock to ethanol.

Briefly, the ligno-cellulosic feedstock was subjected to a hydrothermal treatment at 195° C. for 5 minutes and then steam exploded to atmosphere.

The pre-treated feedstock was subsequently subjected to enzymatic hydrolysis. The pre-treated feedstock was mixed with water to reach a dry matter of 12%, pH was corrected to 5 and a commercial enzyme cocktail was added. Enzymatic hydrolysis was performed at 50° C. for 48 hours under mixing.

The hydrolyzed mixture was then subjected to standard fermentation to ethanol by inoculating a yeast capable to ferment both C6 and C5 monomeric sugars. Fermentation occurred for 72 hours at 32° C.

The fermentation broth was then distilled in a distillation product to produce an ethanol solution at the top of the column and a stillage at the bottom at the column. The stillage was a slurry comprising a free liquid and a solid stillage residue.

The solid stillage residue was separated from the stillage by means of a centrifugal pump and was the treated lignin composition used in the experiments for producing the article and using the article as a fuel.

The moisture content of the treated lignin composition was 65% on a wet basis, and its composition on a dry basis was as follow: lignin: 60%; total residual carbohydrates: 25%; ashes: 15%. Moisture content was determined by oven drying a sample at 110° C. for 24 hours, measuring the sample weight before and after drying.

Process parameters, including the kind of ligno-cellulosic feedstock, steam explosion, enzymatic hydrolysis, fermentation and distillation conditions, were varied over a broad range, without significantly affecting the results obtained in making the disclosed article.

Different wood chips—hardwood and softwood—were tested as combustible support.

Wood chips size was screened through different round hole sieves as described previously.

The treated lignin composition and wood chips were inserted in a screw conveying system and mixed while being conveyed through the system. The multi screw conveying system comprised three parallel conveying screws, each screw having a diameter of 700 mm, a mean pitch of 600 mm, a length of about 8000 mm, and a screw shaft of 220 mm. The screw axes were at a distance of 900 mm, thereby the screws were not superimposed. The screws were operated by electric motors regulated by inverters, with the central screw rotating clockwise and the external screws rotating counter-clockwise. Mixing occurred in full filling factor conditions at 6 rpm. The electrical power consumed during mixing did not vary significantly from the power without load. The treated lignin composition did not accumulate in the two screw conveying screw system, allowing the mixing to work continuously.

Different ratios on a wet basis of treated lignin composition weight to wood chips weight were tested, ranging from 1:3 to 3:1 (lignin:wood).

In all the cases, the treated lignin composition was attached to at least 50% of the wood chip surface; the homogeneity of the coverage and the thickness of the treated lignin composition were found to depend on process parameters, including also kind of wood, chip size and weight ratio. In many cases the treated lignin composition was attached to more than 80% of the wood chip surface, till reaching a complete coverage of the surface of the wood chips.

As a first exemplary experiment, beech wood chips were screened through 100 mm round sieve hole (passing i.e. −100 mm) and 10 mm round sieve hole (not passing i.e. +10 mm).

The treated lignin composition and chips were inserted and mixed in the multi-screw conveying screw system at a weight ratio on a wet basis of about 1:2 (lignin:wood). The treated lignin composition had adhered to combustible support in many locations of the external surface, creating the article comprising a treated lignin composition adhered to at least a portion of the external surface of a combustible support. Most of the combustible supports were covered by a complete layer of the treated lignin composition. The total moisture content of the article was 52%.

As a second exemplary experiment, alder wood chips were screened through 150 mm round sieve hole (passing i.e. −150 mm) and 5 mm round sieve hole (not passing, i.e. +5 mm) and mixed with the treated lignin composition at a weight ratio on a wet basis of about 1.5:1. Also in this case, the wood chips presented the treated lignin composition attached to wide portions of the woodchips surface. Most of the woodchips were completely covered by the treated lignin composition. The thickness of the layer of the treated lignin composition was greater than in the first reported example, due to the greater relative amount of treated lignin composition used. The total moisture content of the article was 56%.

The articles produced in the different experiments were supplied as a fuel in a multi-zone grate firing boiler.

The boiler was operated by feeding a stream of the fuel produced in the exemplary experiments. In both cases, the boiler was operated continuously for more than 12 hours, without any problem. The temperature reached in the furnace varied according to the moisture content and caloric value of the fuel.

A similar composition was made using a mixer which provided for a longer period of mixing time of about 2 minutes and exposing the treated lignin composition and combustible support to more pressure than that associated with conveying. The resulting article, or nugget, was the combustible support completely coated with treated lignin, and the thickness appeared homogeneous and sensibly greater than in the case of conveying screw. Also in this case, the boiler was operated continuously for more than 12 hours, without any problem.

One reading this specification will understand that the inventors have invented a combustible article of manufacture comprising: a treated lignin composition comprising solid lignin which can be selected from the group consisting of organosolv lignin, kraft lignin, steam exploded lignin, ammonia exploded lignin, and hydrothermally treated lignin which may comprise a stillage residue of a fermentation process or a hydrolysis process and may also comprise carbohydrates, with a total percent amount by weight of the carbohydrates in the treated lignin composition on a dry basis is in a range selected from the group consisting of from 5% to 45%, from 10% to 40%, and from 15% to 30%. The treated lignin composition will have a moisture content in a range of 35% to 80% percent by weight of the treated lignin composition on a wet basis. This treated lignin composition is attached to at least a portion of the external surface of a combustible support with a force greater than the force of gravity relative to the treated lignin composition and the size of the portion of the external surface of the combustible support attached to treated lignin composition may be greater than a percent value selected from the group consisting of 50%, 70%, 80%, and 90% of the external surface of the combustible support. The combustible support may have dimensions so that it is capable of passing through a first sieve having first circular holes having a first diameter which is in a range of from 10 mm to 200 mm and is not capable of passing through a second sieve having second circular holes having a second diameter which is in a range of from 5 mm to 100 mm, and the first diameter is greater than the second diameter. The combustible support may have a moisture content on a wet basis which is a value in a range selected from the group consisting of from 1% to 60%, from 1% to 15%, from 2 to 10%, from 20 to 60%, and from 30% to 45% and may be selected from the group consisting of hardwood chips, softwood chips, coal, coke, and shredded tires. The weight ratio of the treated lignin composition to the combustible support on a wet basis may be in a range of 1:10 to 3:1, from 1:2 to 2:1, and from 1: 1.5 to 1.5:1.In an embodiment, the disclosed combustible article of manufacture comprises a treated lignin composition comprising solid steam exploded lignin, wherein the treated lignin composition is attached to at least a portion of the external surface of a combustible support comprised of a hardwood chip with a force greater than the force of gravity relative to the treated lignin composition. In a preferred embodiment, the hardwood chip has a dimension of −200 mm/+10 mm.

In another embodiment, the disclosed combustible article of manufacture comprises a treated lignin composition comprising solid steam exploded lignin, wherein the treated lignin composition is attached to at least a portion of the external surface of a combustible support comprised of a softwood chip with a force greater than the force of gravity relative to the treated lignin composition. In a preferred embodiment, the softwood chip has a dimension of −200 mm/+10 mm.

In another embodiment, the disclosed combustible article of manufacture comprises a treated lignin composition comprising solid steam exploded lignin, wherein the treated lignin composition is attached to at least a portion of the external surface of a combustible support comprised of coal with a force greater than the force of gravity relative to the treated lignin composition. In a preferred embodiment, the hardwood chip has a dimension of −200 mm/+10 mm.

In another embodiment, the disclosed combustible article of manufacture comprises a treated lignin composition comprising solid steam exploded lignin, wherein the treated lignin composition is attached to at least a portion of the external surface of a combustible support comprised of a shredded tire with a force greater than the force of gravity relative to the treated lignin composition. In a preferred embodiment, the shredded tire has a dimension of −200 mm/+10 mm.

In an embodiment, the disclosed combustible article of manufacture comprises a treated lignin composition comprising solid ammonia exploded lignin, wherein the treated lignin composition is attached to at least a portion of the external surface of a combustible support comprised of a hardwood chip with a force greater than the force of gravity relative to the treated lignin composition. In a preferred embodiment, the hardwood chip has a dimension of −200 mm/+10 mm.

In another embodiment, the disclosed combustible article of manufacture comprises a treated lignin composition comprising solid ammonia exploded lignin, wherein the treated lignin composition is attached to at least a portion of the external surface of a combustible support comprised of a softwood chip with a force greater than the force of gravity relative to the treated lignin composition. In a preferred embodiment, the softwood chip has a dimension of −200 mm/+10 mm.

In another embodiment, the disclosed combustible article of manufacture comprises a treated lignin composition comprising solid ammonia exploded lignin, wherein the treated lignin composition is attached to at least a portion of the external surface of a combustible support comprised of coal with a force greater than the force of gravity relative to the treated lignin composition. In a preferred embodiment, the hardwood chip has a dimension of −200 mm/+10 mm.

In another embodiment, the disclosed combustible article of manufacture comprises a treated lignin composition comprising solid ammonia exploded lignin, wherein the treated lignin composition is attached to at least a portion of the external surface of a combustible support comprised of a shredded tire with a force greater than the force of gravity relative to the treated lignin composition. In a preferred embodiment, the shredded tire has a dimension of −200 mm/+10 mm.

In an embodiment, the disclosed combustible article of manufacture comprises a treated lignin composition comprising solid hydrothermally treated lignin, wherein the treated lignin composition is attached to at least a portion of the external surface of a combustible support comprised of a hardwood chip with a force greater than the force of gravity relative to the treated lignin composition. In a preferred embodiment, the hardwood chip has a dimension of −200 mm/+10 mm.

In another embodiment, the disclosed combustible article of manufacture comprises a treated lignin composition comprising solid hydrothermally treated lignin, wherein the treated lignin composition is attached to at least a portion of the external surface of a combustible support comprised of a softwood chip with a force greater than the force of gravity relative to the treated lignin composition. In a preferred embodiment, the softwood chip has a dimension of −200 mm/+10 mm.

In another embodiment, the disclosed combustible article of manufacture comprises a treated lignin composition comprising solid hydrothermally treated lignin, wherein the treated lignin composition is attached to at least a portion of the external surface of a combustible support comprised of coal with a force greater than the force of gravity relative to the treated lignin composition. In a preferred embodiment, the hardwood chip has a dimension of −200 mm/+10 mm.

In another embodiment, the disclosed combustible article of manufacture comprises a treated lignin composition comprising solid hydrothermally treated lignin, wherein the treated lignin composition is attached to at least a portion of the external surface of a combustible support comprised of a shredded tire with a force greater than the force of gravity relative to the treated lignin composition. In a preferred embodiment, the shredded tire has a dimension of −200 mm/+10 mm.

In an embodiment, the disclosed combustible article of manufacture comprises a treated lignin composition comprising solid kraft lignin, wherein the treated lignin composition is attached to at least a portion of the external surface of a combustible support comprised of a hardwood chip with a force greater than the force of gravity relative to the treated lignin composition. In a preferred embodiment, the hardwood chip has a dimension of −200 mm/+10 mm.

In another embodiment, the disclosed combustible article of manufacture comprises a treated lignin composition comprising solid kraft lignin, wherein the treated lignin composition is attached to at least a portion of the external surface of a combustible support comprised of a softwood chip with a force greater than the force of gravity relative to the treated lignin composition. In a preferred embodiment, the softwood chip has a dimension of −200 mm/+10 mm.

In another embodiment, the disclosed combustible article of manufacture comprises a treated lignin composition comprising solid kraft lignin, wherein the treated lignin composition is attached to at least a portion of the external surface of a combustible support comprised of coal with a force greater than the force of gravity relative to the treated lignin composition. In a preferred embodiment, the hardwood chip has a dimension of −200 mm/+10 mm.

In another embodiment, the disclosed combustible article of manufacture comprises a treated lignin composition comprising solid kraft lignin, wherein the treated lignin composition is attached to at least a portion of the external surface of a combustible support comprised of a shredded tire with a force greater than the force of gravity relative to the treated lignin composition. In a preferred embodiment, the shredded tire has a dimension of −200 mm/+10 mm.

In an embodiment, the disclosed combustible article of manufacture comprises a treated lignin composition comprising solid organosolv lignin, wherein the treated lignin composition is attached to at least a portion of the external surface of a combustible support comprised of a hardwood chip with a force greater than the force of gravity relative to the treated lignin composition. In a preferred embodiment, the hardwood chip has a dimension of −200 mm/+10 mm.

In another embodiment, the disclosed combustible article of manufacture comprises a treated lignin composition comprising solid organosolv lignin, wherein the treated lignin composition is attached to at least a portion of the external surface of a combustible support comprised of a softwood chip with a force greater than the force of gravity relative to the treated lignin composition. In a preferred embodiment, the softwood chip has a dimension of −200 mm/+10 mm.

In another embodiment, the disclosed combustible article of manufacture comprises a treated lignin composition comprising solid organosolv lignin, wherein the treated lignin composition is attached to at least a portion of the external surface of a combustible support comprised of coal with a force greater than the force of gravity relative to the treated lignin composition. In a preferred embodiment, the hardwood chip has a dimension of −200 mm/+10 mm.

In another embodiment, the disclosed combustible article of manufacture comprises a treated lignin composition comprising solid organosolv lignin, wherein the treated lignin composition is attached to at least a portion of the external surface of a combustible support comprised of a shredded tire with a force greater than the force of gravity relative to the treated lignin composition. In a preferred embodiment, the shredded tire has a dimension of −200 mm/+10 mm.

The invention claimed is:

1. A combustible article of manufacture comprising:
a treated lignin composition comprising solid lignin and having a moisture content in a range of 35% to 80% percent by weight of the treated lignin composition on a wet basis,
a combustible support having an external surface,
wherein the treated lignin composition is attached to at least a portion of the external surface of the combustible support with a force greater than the force of gravity relative to the treated lignin composition; and the combustible article is not made by a briquetting or pelletizing process;
wherein the combustible support is selected from the group consisting of hardwood chips and softwood chips.

2. The article of claim 1, wherein the treated lignin composition is selected from the group consisting of steam exploded lignin, ammonia exploded lignin, and hydrothermally treated lignin.

3. The article of claim 2, wherein the treated lignin composition comprises a stillage residue of a fermentation process or a hydrolysis process.

4. The article of claim 3, wherein the treated lignin composition further comprises carbohydrates, and a total percent amount by weight of the carbohydrates in the treated lignin composition on a dry basis is in a range selected from the group consisting of from 5% to 45%, from 10% to 40%, and from 15% to 30%.

5. The article of claim 4, wherein the article comprises an amount of sulfur and the amount of sulfur in the article is less than 0.3% on a dry basis.

6. The article of claim 3, wherein the article comprises an amount of sulfur and the amount of sulfur in the article is less than 0.3% on a dry basis.

7. The article of claim 2, wherein the treated lignin composition is obtained without adding sulfuric acid.

8. The article of claim 7, wherein the article comprises an amount of sulfur and the amount of sulfur in the article is less than 0.3% on a dry basis.

9. The article of claim 2, wherein the article comprises an amount of sulfur and the amount of sulfur in the article is less than 0.3% on a dry basis.

10. The article of claim 1, wherein the treated lignin composition is selected from the group consisting of kraft lignin and organosolv lignin.

11. The article of claim 1, wherein the article has a weight ratio of the treated lignin compositin to the combustible support on a wet basis in a range selected from 1:10 to 3:1, from 1:2 to 2:1, and from 1:1.5 to 1.5:1.

12. The article of claim 1, wherein the treated lignin composition is attached to a portion of the external surface of the combustible support which is greater than a percent value selected from the group consisting of 50%, 70%, 80%, and 90% of the external surface of the combustible support.

13. The article of claim 1, wherein the moisture content of the treated lignin composition on a wet basis is a value in a range selected from the group consisting of from 50% to 70%, and from 55% to 65%.

14. The article of claim 1, wherein the moisture content of the article on a wet basis is less than a value selected from the group consisting of 60%, 55%, and 50%.

15. A fuel composition comprising a plurality of the article of claim 1.

16. A method for use of the article of claim 1 as a fuel, comprising:
a. feeding the fuel to an industrial boiler;
b. burning the fuel inside the industrial boiler.

17. The article of claim 1, wherein the combustible support has a moisture content on a wet basis which is a value in a range selected from the group consisting of from 1% to 60%, from 1% to 15%, from 2% to 10%, from 20% to 60%, and from 30% to 45%.

18. The article of claim 1, wherein the combustible support has a dimension of −200 mm/+10 mm.

19. The article of claim 1, wherein the article has a moisture content on a wet basis which is a value in a range selected from the group consisting of from 1% to 60%, from 1% to 15%, from 2% to 10%, from 20% to 60%, and from 30% to 45%.

* * * * *